United States Patent [19]
Jaekel

[11] Patent Number: 5,836,431
[45] Date of Patent: Nov. 17, 1998

[54] TRANSMISSION CLUTCH HOUSING FORMED FROM A SINGLE PIECE OF METAL AND METHOD FOR MAKING THE SAME

[75] Inventor: Fred G. Jaekel, Richmond Hill, Canada

[73] Assignee: Cosma International Inc., Ontario, Canada

[21] Appl. No.: 944,825

[22] Filed: Oct. 6, 1997

Related U.S. Application Data

[62] Division of Ser. No. 699,345, Aug. 19, 1996.

[51] Int. Cl.$^6$ .................................................. F16H 55/44
[52] U.S. Cl. ........................ 192/70.2; 474/170; 474/171
[58] Field of Search ............................... 192/70.2, 48.91; 474/171, 170; 74/449

[56] References Cited

U.S. PATENT DOCUMENTS

| | | |
|---|---|---|
| 1,795,379 | 1/1931 | Schmidt . |
| 2,185,714 | 1/1940 | Scherer ................................ 192/70.2 X |
| 2,729,317 | 1/1956 | Schwab .................................. 192/70.2 |
| 2,914,158 | 11/1959 | Zeidler et al. ...................... 192/70.2 X |
| 3,105,582 | 10/1963 | Ziabicki ............................ 192/48.91 X |
| 3,491,865 | 1/1970 | Stockton ............................ 192/70.2 X |
| 3,744,605 | 7/1973 | Piret ........................................ 192/70.2 |
| 4,131,032 | 12/1978 | Warland et al. ............................ 74/449 |
| 4,388,817 | 6/1983 | Victor . |
| 4,532,786 | 8/1985 | Schaible . |
| 4,749,375 | 6/1988 | Guevel et al. . |
| 4,936,129 | 6/1990 | Lipper et al. . |
| 5,152,061 | 10/1992 | Himmeroeder . |
| 5,384,949 | 1/1995 | Wodrich et al. .................... 192/70.2 X |

FOREIGN PATENT DOCUMENTS

| | | |
|---|---|---|
| 3931599 A1 | 9/1989 | Germany . |
| 328288 | 8/1935 | Italy ....................................... 192/70.2 |
| 61-132238 | 6/1986 | Japan . |
| 6-137424 | 5/1994 | Japan .................................... 192/70.2 |

*Primary Examiner*—Rodney H. Bonck
*Attorney, Agent, or Firm*—Cushman Darby & Cushman IP Group of Pillsbury Madison & Sutro LLP

[57] ABSTRACT

A transmission clutch housing for transmitting a rotational motion from a driving shaft to a driven shaft in conjunction with a clutch plate assembly is formed from a single piece of metal. The housing includes a central web structure extending axially from an axis of rotation, a splined clutch-plate-engaging flange extending axially From the central web structure, and a rotational member coupling flange, which may be in the form of a pulley or a gear, also extending axially from the central web structure. In the method of forming the transmission clutch housing, a flat metal blank is placed on a spin forging device. A peripheral edge of the blank is split in a radial direction by a splitting tool to form two split portions. The two split portions are then spin formed into the splined clutch-plate-engaging flange and the rotational member coupling flange.

8 Claims, 4 Drawing Sheets

TRANSMISSION CLUTCH HOUSING
FORMED FROM A SINGLE PIECE OF
METAL AND METHOD FOR MAKING THE
SAME

This is a division of application Ser. No. 08/699,345 filed Aug. 19, 1996

BACKGROUND OF THE INVENTION

1. Field of the Invention

The present invention relates to a transmission clutch housing, which is cold formed from a single piece of metal, to be used in conjunction with a clutch plate assembly for transmitting a rotational motion from a driving member to a driven member.

2. Related Art

Transmission clutch housings for transmitting a rotational motion from a driving rotational shaft to a driven rotational shaft in conjunction with a clutch plate assembly having driving clutch plates and driven clutch plates have in the past been typically been made in the form shown in FIG. 9. The transmission clutch housing 60 is rotatable about axis of rotation 61 and comprises two "cans" 62, 64 welded, or mechanically attached, back to back at 66 to form a housing having axial flanges 68 and 70. One flange is splined so as to be able to engage clutch plates, and the other flange is constructed to be either a pulley or a gear. Such a construction presents a number of disadvantages, including extra material and weight required by the two piece welded construction and the possibility of cracking in the welded area, often due to weld imperfections.

In the present invention, a transmission clutch housing is made from a single piece of metal. The two axial flanges for engaging clutch plates and a pulley belt or gear are formed by splitting a peripheral portion of a flat plate metal sheet in a radial direction. The resulting two split portions are then cold formed into the axial flanges. The process of splitting a single sheet of metal in a radial direction and cold forming the resulting split portions into a desired shape is known in the art.

For example, U.S. Pat. No. 4,749,375 discloses a multiple V-groove pulley and method for making the same. In the method, a peripheral portion of a flat sheet of metal is split to form two lips which are urged back, or spin-formed, in opposite directions so as to extend perpendicularly from a central web portion. The formed flanges are both disposed at the same radius from the axis of rotation so that together they form a cylindrical rim projecting from each side of the central web. One or more series of V-grooves can be formed on the cylinder rim to complete the pulley.

Patent '375 does not, however, disclose a transmission clutch housing that is part of a clutch plate assembly. It does not disclose a rotation transmitting member having a splined clutch plate engaging flange and a second flange formed into a pulley or gear, nor does it disclose that it is possible to form the split lips into flanges disposed at different radii from the axis of rotation.

Other references which disclose methods involving splitting and cold forming a single piece of metal include U.S. Pat. No. 4,388,817, No. 4,532,786, and No. 4,936,129. Each of these patents discloses a method of forming a vehicle wheel from a single piece of metal wherein, during the wheel-forming process, a peripheral portion of the metal preform is split radially to form two annular split portions, which are then formed into different portions of the wheel rim. Again, however, there is no teaching of a single piece transmission clutch housing to be used in conjunction with a clutch plate assembly.

Accordingly, a resolution to the problems encountered by prior art transmission clutch housings, such as that shown in FIG. 9, have not been developed in the prior art.

SUMMARY OF THE INVENTION

A transmission clutch housing constructed from a single piece of metal, which is light weight and more durable as compared with prior art clutch housings, is provided. The clutch housing, or rotational motion transmitting member, is constructed and arranged to rotate about an axis of rotation for selectively transmitting a rotational motion from a driving rotational member to a driven rotational member. The rotational motion transmitting member operates in conjunction with a clutch plate assembly including a plurality of parallel annular clutch plates constructed and arranged for axial movement with respect to one another between a relative slipping relationship and an engaged relationship. The plurality of parallel annular clutch plates include a driven set of clutch plates and a driving set of clutch plates.

A central web structure extends radially from the axis of rotation. A splined clutch plate engaging structure, or flange, extends axially from the central web structure and is constructed and arranged to engage a periphery of a one of the driving set of clutch plates and the driven set of clutch plates so as to transmit rotary motion between the one set of clutch plates and the rotational motion transmitting member. The flange may be internally-splined to engage the outer peripheral portion of the one set of clutch plates, or the flange may be externally-splined to engage the inner peripheral portion of the one set of clutch plates.

Finally, a rotational member coupling structure, or flange, extends axially from the central web structure and is constructed and arranged to be operatively associated with a one of the driving rotational member and the driven rotational member so as to transmit rotary motion between the one rotational member and the rotational motion transmitting member. The rotational member coupling flange is preferably in the form of a pulley or a gear.

The central web structure, the splined clutch plate engaging structure, and the rotational member coupling structure are all integrally formed from a single piece of sheet metal material.

Furthermore, a method for constructing the transmission clutch housing described above from a single piece of metal is provided.

A generally circular sheet metal blank is provided and is rotated while a splitting tool engages a peripheral edge of the blank to split the peripheral edge of the blank in a radial direction to create first and second annular split portions. A portion of the blank that is not split defines at least a portion of a radially extending central web structure.

The first annular split portion is formed into a splined clutch plate engaging structure, which extends axially from the central web structure and is constructed and arranged to engage a periphery of a one of the driving set of clutch plates and the driven set of clutch plates so as to transmit rotary motion between the one set of clutch plates and the rotational motion transmitting member.

The second annular split portion is formed into a rotational member coupling structure, which extends axially from the central web structure and is constructed and arranged to be operatively associated with a one of the driving rotational member and the driven rotational member so as to transmit rotary motion between the one rotational member and the rotational motion transmitting member.

These and other features of the present invention will become more apparent during the course of the following detailed description and appended claims. The invention may best be understood with reference to the accompanying drawings wherein illustrative embodiments are shown.

DESCRIPTION OF THE INVENTION

Figure 1:
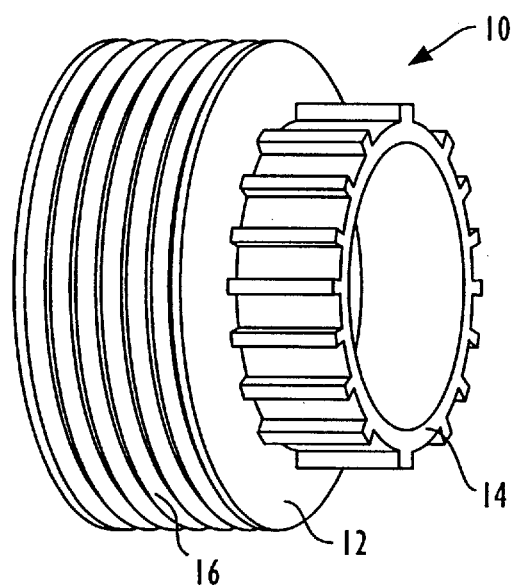
FIG. 1 is a perspective view of a transmission clutch housing according to one embodiment of the present invention.

A transmission clutch housing according to one embodiment of the present invention is shown in FIG. 1. The housing 10 is formed from a metal capable of being cold formed and includes a central web 12 and first and second cylindrical flanges 14 and 16.

First and second flanges 14 and 16 are shown in FIG. 1 to be disposed at different radii from the axis of rotation of the housing 10, flange 14 being disposed at a smaller radius than flange 16. It is to be understood, however, that flanges 14 and 16 could as well be disposed at the same radius from the axis of rotation, or flange 16 could be disposed at a smaller radius than flange 14, depending on application requirements.

In addition, although flanges 14 and 16 are shown to extend axially in opposite directions from the central web 12, the present invention also contemplates having flanges 14 and 16 extending in the same axial direction from the web 12, if desired.

In the embodiment shown in FIG. 1, flange 14 is splined on the external periphery thereof for engaging annular clutch plates disposed about the outer periphery of flange 14. Flange 16 is shown having the form of a poly-V pulley adapted to receive a poly-V belt (not shown) to transmit motion to or from the housing 10, via the belt, to one or more additional rotary members (not shown).

Figure 2:
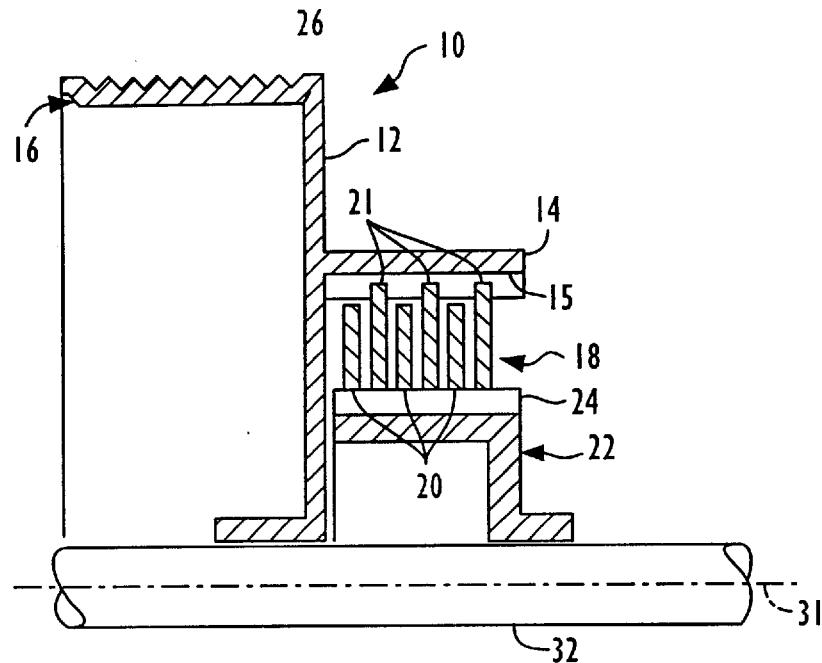
FIG. 2 is a cross section of a transmission clutch housing according to one embodiment of the present invention, shown in conjunction with a clutch plate assembly.

In FIG. 2, the transmission clutch housing 10 is shown assembled in conjunction with a clutch plate assembly. As the clutch plate assembly and the transmission clutch housing 10 are symmetric about an axis of rotation 31, only one-half thereof are shown for simplicity. In the assembly shown in FIG. 2, flange 16 of transmission clutch housing 10 is a rotation transmitting flange having a series of V-grooves 26 formed therein for receiving a poly-V belt. Flange 14 is internally splined, having a series of splines 15 formed on the inner periphery thereof. Splines 15 engage the outer peripheries of annular clutch plates 21, which are disposed in parallel alternating fashion with respect to clutch plates 20. The inner peripheries of clutch plates 20 engage external splines 24 of inner gear 22. As is conventional in clutch plate assemblies of this type, the clutch plates 20 and 21 of clutch plate assembly 18 are disposed in the annular space between flange 14 and inner gear 22 for axial movement with respect to one another between a relative slipping relationship in which no motion is transmitted between inner gear 22 and flange 14, and an engaged relationship in which motion is transmitted between inner gear 22 and flange 14. Inner gear 22 is typically coupled with a drive shaft, such as drive shaft 32. Clutch plates 21 will either be driving clutch plates or driven clutch plates and clutch plates 20 will either be driving clutch plates or driven clutch plates depending on whether motion is being transmitted from flange 14 to inner gear 22 or vice versa.

Figure 3:
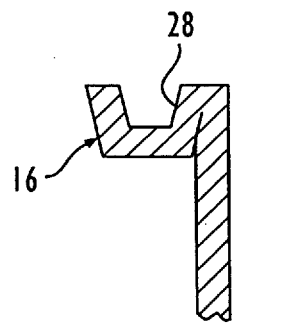
FIG. 3 is a partial cross section of a second flange formed as a single V-pulley.
Figure 4:
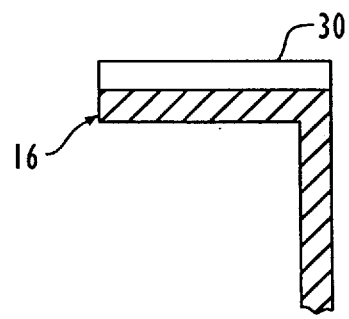
FIG. 4 is a partial cross section of a second flange shown formed as an externally toothed gear.

Flange 16 is operatively coupled, via pulley belts or gears or the like, with external rotary members (not shown) that will be either driven rotary members or driving rotary members. As shown in FIG. 3, flange 16 can be formed as a single-V pulley for engaging a V-shaped belt, or as shown in FIG. 4, flange 16 could be formed with external gear teeth 30 for engaging the associated gear teeth of a second gear member (not shown). In addition, flange 16 could be formed with internal gear teeth formed on the inner periphery thereof, or flange 16 could be substantially smooth for engaging a flat belt.

The method of forming a single piece transmission clutch housing according to the present invention is shown in FIGS. 5–8.

Figure 5:
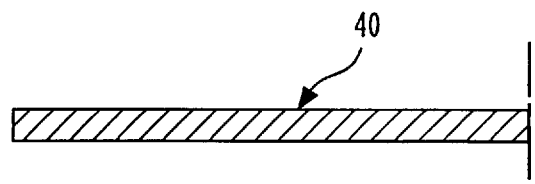
FIGS. 5–8 show sequential steps in the method for making a single piece transmission clutch housing according to the present invention.
Figure 6:
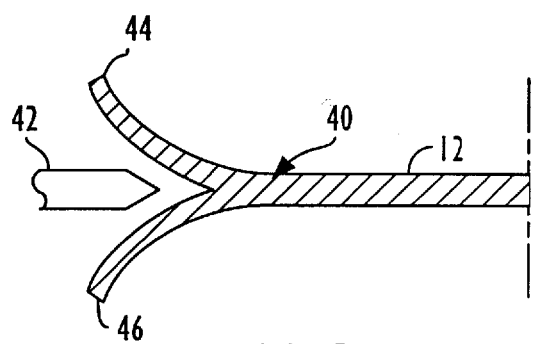
Figure 7:
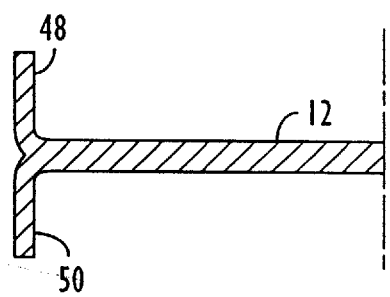
Figure 8:
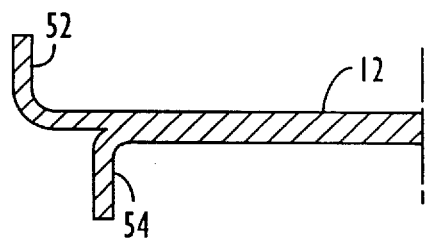
Figure 9:
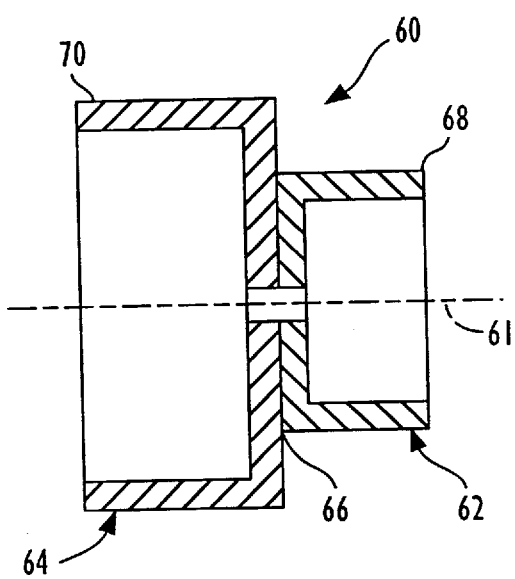
FIG. 9 is a cross section of a prior art transmission clutch housing.

As represented in FIG. 5, a disk blank 40, comprised of a metal capable of being cold formed, is placed on a spin forging machine, the details of which are well known in the art. As shown in FIG. 6, the outer peripheral edge of the blank 40 is engaged by a splitting roller 42, or the like, to split the peripheral edge in the radial direction to form two split portions 44 and 46 and at least a portion of the central web 12. Split portions 44 and 46 are then cold formed so as to extend axially from the web 12. As shown in FIG. 7, the split portions could be formed into flanges 48 and 50 disposed at equal radii from the axis of rotation. Alternatively, as shown in FIG. 8, flanges 52 and 54 can he formed so as to be disposed at different radii from the axis of rotation.

With the flanges thus formed, gear teeth, splines, or one or more V-grooves can be formed in the flanges by methods known in the art. For example, U.S. Pat. No. 4,273,547, the disclosure of which is incorporated by reference, discloses a method for forming V-groove pulleys. Also, U.S. Pat. No. 5,152,061, the disclosure of which is incorporated by reference, discloses a method for cold forming gear teeth or splines in the exterior surface of the cylindrical wall of a rotation transmitting member. Finally, commonly assigned U.S. patent application (Dkt. No. 199), discloses a method for forming a torque transmitting member with an improved lubrication controlling dam structure formed in the internal and external spline structure thereof. The contents of this application are incorporated by reference.

It will be realized that the foregoing preferred specific embodiments of the present invention have been shown and described for the purposes of illustrating the functional and instructional principles of this invention and are subject to change without departure from such principles. Therefore, this invention includes all modifications encompassed within the spirit and scope of the following claims.

What is claimed is:

1. A rotational motion transmitting member constructed and arranged to rotate about an axis of rotation for selectively transmitting a rotational motion from a driving rotational member to a driven rotational member in conjunction with a clutch plate assembly including a plurality of parallel annular clutch plates constructed and arranged for axial movement with respect to one another between a relative slipping relationship and an engaged relationship, the plurality of parallel annular clutch plates including a driven set of clutch plates and a driving set of clutch plates, said rotational motion transmitting member comprising:

a central web structure extending radially from said axis of rotation;

a splined clutch plate engaging structure extending axially from said central web structure constructed and arranged to engage a periphery of a one of the driving set of clutch plates and the driven set of clutch plates so as to transmit rotary motion between the one set of clutch plates and said rotational motion transmitting member; and a rotational member coupling structure extending axially from said central web structure constructed and arranged to be operatively associated with a one of the driving rotational member and the driven rotational member so as to transmit rotary motion between the one rotational member and said rotational motion transmitting member, said rotational member coupling structure comprising a poly-V-groove pulley constructed and arranged to receive a poly-V-shaped belt operatively coupled with the one rotational member.

said central web structure, said splined clutch plate engaging structure, and said rotational member coupling structure all being integrally formed from a single piece of sheet metal material.

2. The rotational motion transmitting member of claim 1 wherein said splined clutch plate engaging structure includes inner splines formed on an inner periphery thereof which are constructed and arranged to engage an outer periphery of the one set of clutch plates.

3. The rotational motion transmitting member of claim 1 wherein said splined clutch plate engaging structure and said rotational member coupling structure extend axially from opposite sides of said central web structure.

4. The rotational motion transmitting member of claim 1 wherein a radial distance of said splined clutch plate engaging structure from said axis is not equal to a radial distance of said rotational member coupling structure from said axis.

5. A rotational motion transmitting member constructed and arranged to rotate about an axis of rotation for selectively transmitting a rotational motion from a driving rotational member to a driven rotational member in conjunction with a clutch plate assembly including a plurality of parallel annular clutch plates constructed and arranged for axial movement with respect to one another between a relative slipping relationship and an engaged relationship, the plurality of parallel annular clutch plates including a driven set of clutch plates and a driving set of clutch plates, said rotational motion transmitting member comprising:

a central web structure extending radially from said axis of rotation;

a splined clutch plate engaging structure extending axially from said central web structure constructed and arranged to engage a periphery of a one of the driving set of clutch plates and the driven set of clutch plates so as to transmit rotary motion between the one set of clutch plates and said rotational motion transmitting member; and a rotational member coupling structure extending axially from said central web structure constructed and arranged to be operatively associated with a one of the driving rotational member and the driven rotational member so as to transmit rotary motion between the one rotational member and said rotational motion transmitting member, wherein said rotational member coupling structure comprises a V-groove pulley constructed and arranged to receive a V-shaped belt operatively coupled with the one rotational member;

said central web structure, said splined clutch plate engaging structure, and said rotational member coupling structure all being integrally formed from a single piece of sheet metal material.

6. The rotational motion transmitting member of claim 5 wherein said splined clutch plate engaging structure includes inner splines formed on an inner periphery thereof which are constructed and arranged to engage an outer periphery of the one set of clutch plates.

7. The rotational motion transmitting member of claim 5 wherein said splined clutch plate engaging structure and said rotational member coupling structure extend axially from opposite sides of said central web structure.

8. The rotational motion transmitting member of claim 5 wherein a radial distance of said splined clutch plate engaging structure from said axis is equal to a radial distance of said rotational member coupling structure from said axis.

* * * * *